US008851049B2

(12) United States Patent
Ootaki et al.

(10) Patent No.: US 8,851,049 B2
(45) Date of Patent: Oct. 7, 2014

(54) ENGINE CONTROL DEVICE

(75) Inventors: Ryouichi Ootaki, Fujisawa (JP); Masahiro Iriyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 964 days.

(21) Appl. No.: 12/999,875

(22) PCT Filed: Apr. 28, 2009

(86) PCT No.: PCT/JP2009/058356
§ 371 (c)(1),
(2), (4) Date: Dec. 17, 2010

(87) PCT Pub. No.: WO2009/157256
PCT Pub. Date: Dec. 30, 2009

(65) Prior Publication Data

US 2011/0098907 A1 Apr. 28, 2011

(30) Foreign Application Priority Data

Jun. 23, 2008 (JP) ................................ 2008-162714

(51) Int. Cl.

| | |
|---|---|
| ***F02D 41/12*** | (2006.01) |
| ***F02M 51/00*** | (2006.01) |
| ***F02D 31/00*** | (2006.01) |
| ***F02B 77/08*** | (2006.01) |
| ***G06F 19/00*** | (2011.01) |
| ***F16H 61/662*** | (2006.01) |
| ***F02D 29/02*** | (2006.01) |
| *F02D 41/02* | (2006.01) |

(52) U.S. Cl.
CPC ............ *F02D 29/02* (2013.01); *F02D 41/0215* (2013.01); *F02D 41/123* (2013.01); *F02D 2200/501* (2013.01); *F02D 2250/28* (2013.01)
USPC ..... 123/325; 123/493; 123/333; 123/198 DB; 701/110; 701/112; 477/43; 477/47

(58) Field of Classification Search
CPC ... F02D 29/02; F02D 41/0215; F02D 41/123; F02D 41/12; F02D 2200/501; F02D 9/00; F02D 31/009
USPC ............... 701/110, 112; 477/43, 47; 123/481, 123/486, 493, 325, 332, 333, 198 DB, 198 F, 123/320
See application file for complete search history.

(56) References Cited

U.S. PATENT DOCUMENTS 3,866,584 A * 2/1975 Bigalke et al. ................ 123/333
4,078,631 A * 3/1978 Kadota et al. ................ 180/179
4,371,050 A * 2/1983 Ikeura .......................... 180/271
(Continued)

FOREIGN PATENT DOCUMENTS

JP 54-7021 A 1/1979
JP 5-113142 A 5/1993
(Continued)

*Primary Examiner* — Stephen K Cronin
*Assistant Examiner* — George Jin
(74) *Attorney, Agent, or Firm* — Foley & Lardner LLP

(57) ABSTRACT

In a vehicle in which an output of an engine is transmitted to a driving wheel through a transmission, an engine control device stops fuel injection of the engine, when engine rotational speed is above a preset specific fuel cut-off rotational speed while the vehicle is coasting; and restarts the fuel injection, when the engine rotational speed falls below a recovery rotational speed while the fuel injection is stopped, wherein the recovery rotational speed is below the specific fuel cut-off rotational speed. When determining that an operating state allows the stop and restart of fuel injection to be repeated, the engine control device sets a hunting-preventing fuel cut-off rotational speed based on an input shaft rotational speed of the transmission, wherein the hunting-preventing fuel cut-off rotational speed replaces the specific fuel cut-off rotational speed.

8 Claims, 4 Drawing Sheets

(56) References Cited

U.S. PATENT DOCUMENTS

| | | | | |
|---|---|---|---|---|
| 4,539,643 | A * | 9/1985 | Suzuki et al. | 701/112 |
| 4,694,796 | A * | 9/1987 | Mori | 123/325 |
| 4,790,275 | A * | 12/1988 | Iida | 123/325 |
| 5,658,217 | A * | 8/1997 | Tsukada | 477/109 |
| 5,928,111 | A * | 7/1999 | Sakakibara et al. | 477/181 |
| 2006/0231068 | A1* | 10/2006 | Weiss et al. | 123/325 |
| 2008/0168964 | A1* | 7/2008 | Kimura et al. | 123/325 |
| 2011/0098907 | A1* | 4/2011 | Ootaki et al. | 701/104 |

FOREIGN PATENT DOCUMENTS

| | | | |
|---|---|---|---|
| JP | 5-280394 | A | 10/1993 |
| JP | 2000-118267 | A | 4/2000 |
| JP | 2005-76499 | A | 3/2005 |

* cited by examiner

ENGINE CONTROL DEVICE

TECHNICAL FIELD

The present invention relates to an engine control device that cuts off fuel injection of an internal combustion engine while a motor vehicle is running.

BACKGROUND OF THE INVENTION

JP 5-280394 A (henceforth referred to as patent document 1) discloses a technique of: stopping or cutting off fuel injection of an engine (henceforth referred to as fuel cut-off) when engine rotational speed is above a predetermined fuel cut-off rotational speed while a vehicle is coasting; and restarting fuel injection or recovering from fuel cut-off (henceforth referred to as fuel cut-off recovery) when the engine rotational speed falls below a recovery rotational speed under condition that fuel injection is stopped, wherein the recovery rotational speed is below the fuel cut-off rotational speed. Patent document 1 discloses (1) performing a correction of increasing the fuel cut-off rotational speed at start of fuel cut-off, (2) performing the operation (1) again when fuel cut-off is performed again after fuel cut-off recovery, and (3) repeating the operations (1) and (2) as long as the vehicle continues coasting. This is targeted for suppressing repetition or hunting between fuel cut-off and fuel cut-off recovery at downhill coasting.

SUMMARY OF THE INVENTION

The technique of patent document 1 can be subject to a problem that at coasting on a steep downhill, the operations (1) and (2) are repeatedly performed, which results in an increase in the frequency of hunting between fuel cut-off and fuel cut-off recovery. Namely, the technique of patent document 1 is insufficient to prevent hunting, although may serve to suppress hunting.

In view of the problem described above, it is an object of the present invention to provide an engine control device that is capable of preventing repetition between fuel cut-off and fuel cut-off recovery.

According to one aspect of the present invention, in a vehicle in which an output of an engine is transmitted to a driving wheel through a transmission, an engine control device comprises: a sensor for sensing an operating state of the vehicle; and a controller connected to the sensor, wherein the controller is configured to: stop fuel injection of the engine, when engine rotational speed is above a preset specific fuel cut-off rotational speed while the vehicle is coasting; restart the fuel injection, when the engine rotational speed falls below a recovery rotational speed while the fuel injection is stopped, wherein the recovery rotational speed is below the specific fuel cut-off rotational speed; determine whether or not the operating state allows the stop and restart of fuel injection to be repeated; and setting a hunting-preventing fuel cut-off rotational speed based on an input shaft rotational speed of the transmission, when determining that the operating state allows the stop and restart of fuel injection to be repeated, wherein the hunting-preventing fuel cut-off rotational speed replaces the specific fuel cut-off rotational speed.

DETAILED DESCRIPTION

Figure 1:
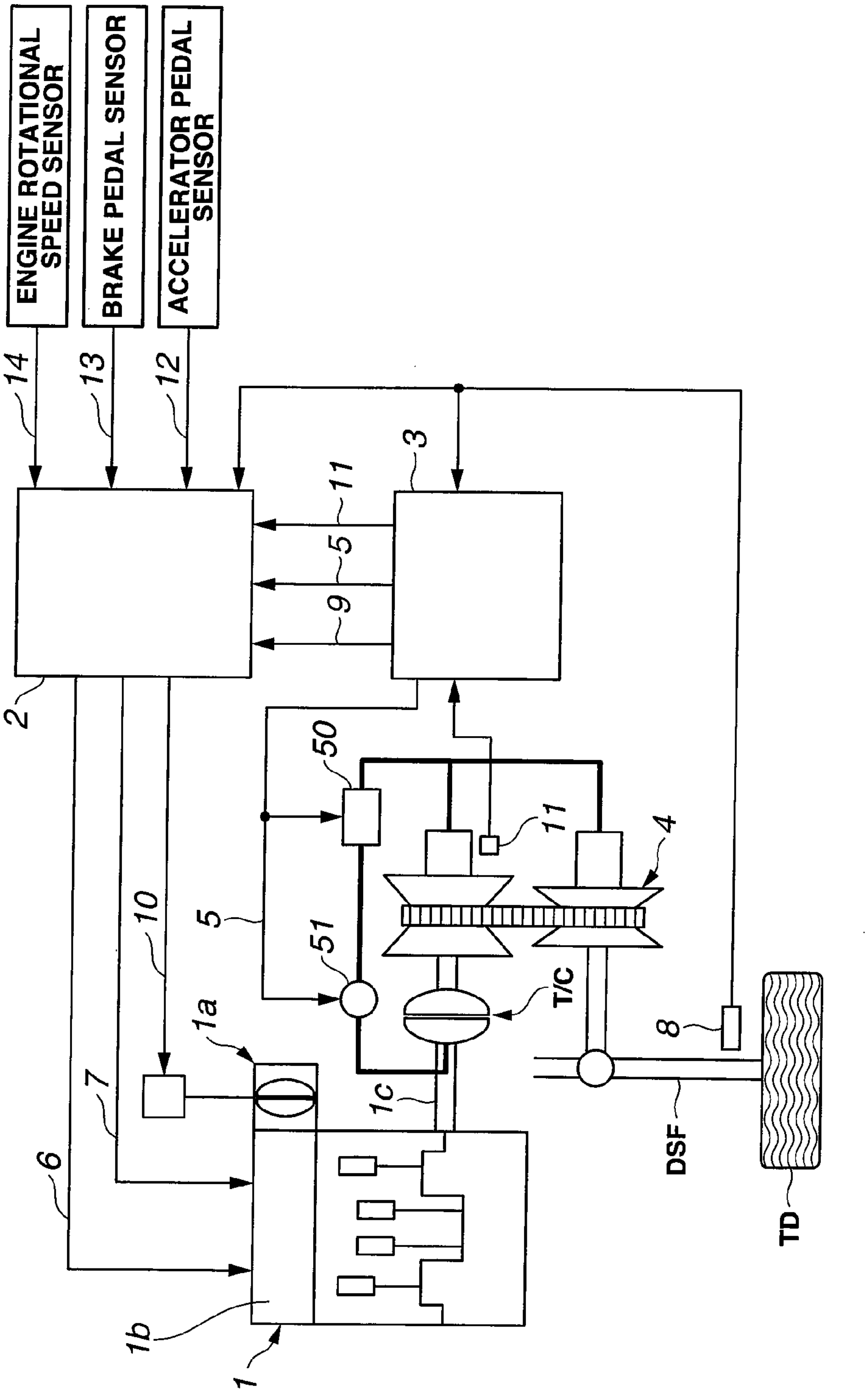
FIG. 1 is a diagram showing a whole system of a vehicle provided with an engine control device according to a first embodiment.

FIG. 1 shows a whole system of a vehicle provided with an engine control device according to a first embodiment. An engine 1 is provided with a throttle actuator 1*a* for controlling a throttle opening, and an injector 1*b* for controlling a fuel injection quantity. Engine 1 generates a driving torque and outputs same through an engine output shaft 1*c*.

Engine output shaft 1*c* is connected to a torque converter "T/C" provided with a lockup mechanism. The lockup mechanism is operated by hydraulic pressure that is supplied from a control valve unit 50 described below, and suitably switched by a lockup control valve 51. When the lockup mechanism is inoperative, the torque converter T/C outputs a larger torque than the engine output torque by a torque amplification function, while outputting a lower rotational speed than the engine rotational speed. On the other hand, when the lockup mechanism is operating, the torque converter T/C outputs the engine output torque as it is, while outputting the engine output speed as it is.

Torque converter T/C has an output shaft connected to a transmission input shaft, and connected to a belt-type continuously variable transmission 4. Belt-type continuously variable transmission 4 has a commonly-known construction, i.e. including a primary pulley and a secondary pulley which are provided with fluid chambers, wherein a groove width of each of the primary pulley and the secondary pulley is suitably changed by supplied hydraulic pressure so as to obtain a desired transmission speed ratio.

Belt-type continuously variable transmission 4 outputs a rotation which is transmitted through a drive shaft "DSF" to a driving wheel "TD" so as to drive the vehicle.

Engine 1 is controlled according to a command signal from an engine controller 2. Engine controller 2 is provided with input signals, namely, a lockup signal 5, a transmission speed ratio signal 9, and a transmission input shaft rotational speed sensor 11 from a CVT control unit 3 described below, and signals from a vehicle speed sensor 8, an accelerator pedal sensor 12, a brake pedal sensor 13, and an engine rotational speed sensor 14. On a basis of these input signals, engine controller 2 outputs a throttle command signal 10 to throttle actuator 1*a*, and outputs a fuel cut-off signal 6 and a fuel cut-off recovery signal 7 to injector 1*b*.

Belt-type continuously variable transmission 4 is controlled according to a command signal from CVT control unit 3. CVT control unit 3 is provided with input signals, namely, signals from vehicle speed sensor 8, and transmission input shaft rotational speed sensor 11. On a basis of these input signals, CVT control unit 3 controls a primary pulley hydraulic pressure, a secondary pulley hydraulic pressure, and a hydraulic pressure of the lockup mechanism, by operating electromagnetic valves provided in control valve unit 50.

CVT control unit 3 is provided with an automatic transmission mode in which the transmission speed ratio is determined on a basis of driving conditions. Specifically, CVT control unit 3 determines the transmission speed ratio by using a shift schedule that is preset on a basis of a relationship between accelerator pedal opening and vehicle speed, and then outputs the transmission speed ratio signal 9. The shift schedule defines a lockup region. Upon entrance into a lockup control start region, CVT control unit 3 outputs a lockup signal 5.

Moreover, belt-type continuously variable transmission 4 is provided with a manual mode in which a plurality of fixed transmission speed ratios can be selected by driver's operation. When a driver selects a desired speed stage by operation of a shift lever not shown, the transmission speed ratio is fixed to a transmission speed ratio corresponding to the selected speed stage. The first embodiment employs six speed stages, but may employ more or less than six.

Figure 2:
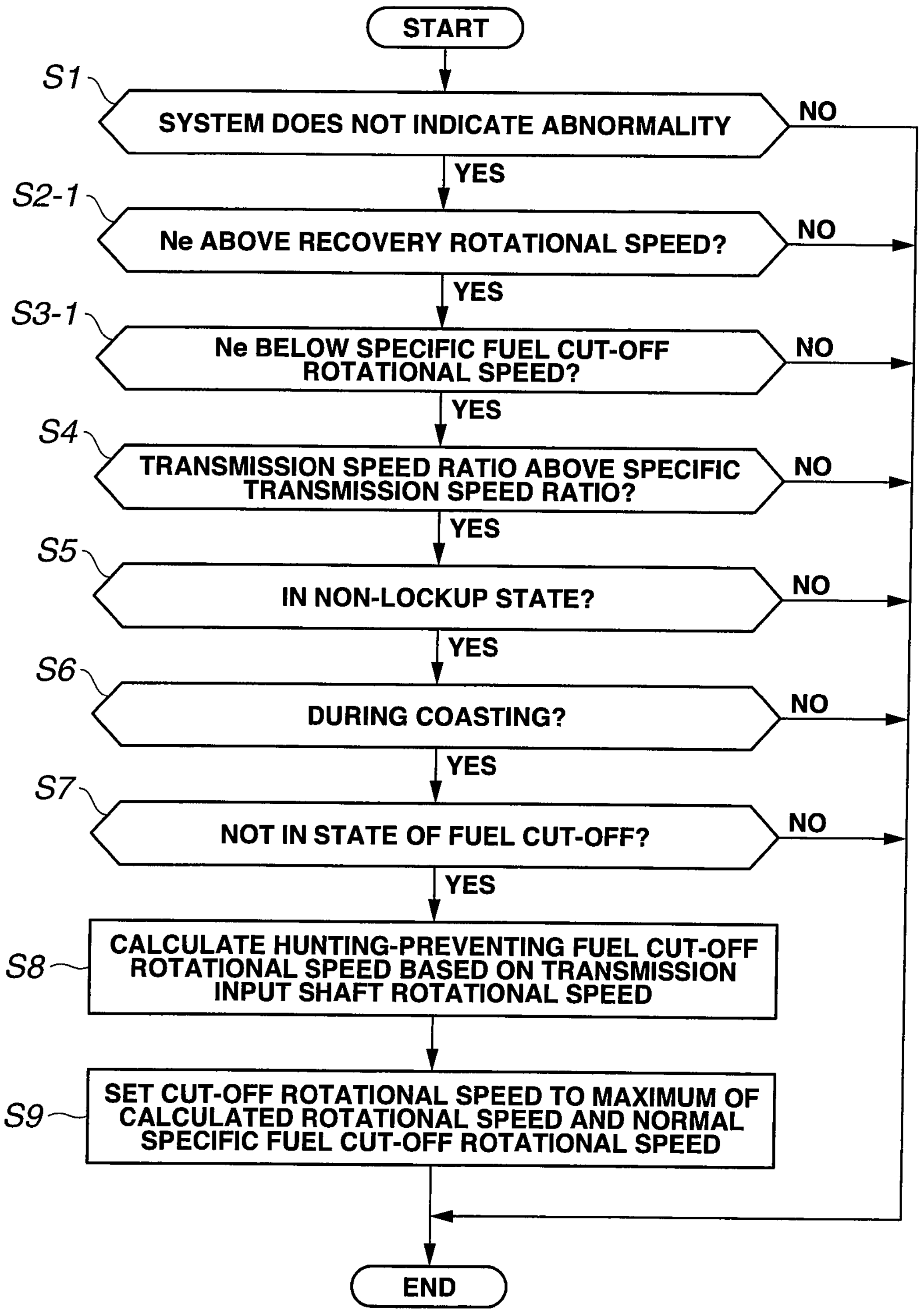
FIG. 2 is a flow chart showing a fuel cut-off rotational speed setting operation in a fuel cut-off control performed by an engine controller according to the first embodiment.

FIG. 2 is a flow chart showing a fuel cut-off rotational speed setting operation in a fuel cut-off control performed by engine controller 2 according to the first embodiment. The fuel cut-off control is a control of: performing fuel cut-off, when a predetermined condition is satisfied during fuel injection, and the engine rotational speed is above a fuel cut-off rotational speed; and terminates fuel cut-off, when the engine rotational speed falls due to fuel cut-off to below a fuel cut-off recovery rotational speed.

At Step S1, engine controller 2 determines whether the system does not indicate abnormality. When determining that a system does not indicate abnormality, engine controller 2 proceeds to Step S2-1. When determining that the system indicates abnormality, engine controller 2 exits from this control flow.

At Step S2-1, engine controller 2 determines whether or not engine rotational speed Ne is above a predetermined recovery rotational speed. When determining that engine rotational speed Ne is above the recovery rotational speed, engine controller 2 proceeds to Step S3-1. Otherwise, engine controller 2 exits from this control flow.

At Step S3-1, engine controller 2 determines whether or not engine rotational speed Ne is below a preset specific fuel cut-off rotational speed. When determining that engine rotational speed Ne is below the specific fuel cut-off rotational speed, engine controller 2 proceeds to Step S4. Otherwise, engine controller 2 exits from this control flow.

In this way, on a basis of the signal from engine rotational speed sensor 14, engine controller 2 determines at Step S2-1 whether or not the equation of (engine rotational speed Ne≥recovery rotational speed) holds, and determines at Step S3-1 whether or not the equation of (engine rotational speed Ne≤specific fuel cut-off rotational speed) holds. It is because hunting may occur in this region that the engine controller 2 determines whether or not engine rotational speed Ne is in this region.

At Step S4, engine controller 2 determines whether or not the transmission speed ratio is above a specific transmission speed ratio (specifically, in a first speed range or second speed range of the manual mode). When determining that the transmission speed ratio is above the specific transmission speed ratio, engine controller 2 proceeds to Step S5. Otherwise, engine controller 2 exits from this control flow.

At Step S5, engine controller 2 determines whether or not it is in non-lockup state, namely, in a state where the lockup mechanism is inoperative. When determining that it is in non-lockup state, engine controller 2 proceeds to Step S6. Otherwise, engine controller 2 exits from this control flow. This is because when in lockup state, engine rotational speed Ne is uniquely determined in view of driving wheel TD and the transmission speed ratio so that no hunting occurs.

At Step S6, engine controller 2 determines whether or not the vehicle is coasting. When determining that the vehicle is coasting, engine controller 2 proceeds to Step S7. Otherwise, namely, when determining that the vehicle is driving, engine controller 2 exits from this control flow. "Coasting" means a condition that the accelerator pedal opening is below a specific value, and the brake pedal is not depressed, namely, a coasting condition.

At Step S7, engine controller 2 determines on a basis of fuel cut-off signal 6 whether the it is not in a state of fuel cut-off, namely, is in a state where fuel is being injected. When determining that it is in a state where fuel is being injected, engine controller 2 proceeds to Step S8. Otherwise, engine controller 2 exits from this control flow.

At Step S8, on a basis of the signal from transmission input shaft rotational speed sensor 11, engine controller 2 calculates a hunting-preventing fuel cut-off rotational speed. The hunting-preventing fuel cut-off rotational speed is a rotational speed threshold, wherein when engine rotational speed Ne is above the rotational speed threshold, fuel cut-off is performed. The hunting-preventing fuel cut-off rotational speed is changed only when the specific condition described above is satisfied.

At Step S9, engine controller 2 sets a fuel cut-off rotational speed to a maximum of the calculated hunting-preventing fuel cut-off rotational speed and a normal specific fuel cut-off rotational speed. The normal specific fuel cut-off rotational speed is a setpoint which is preset according to vehicle characteristics, etc. Namely, at this step, engine controller 2 performs select-high operation between the calculated hunting-preventing fuel cut-off rotational speed and the setpoint.

Figure 3:
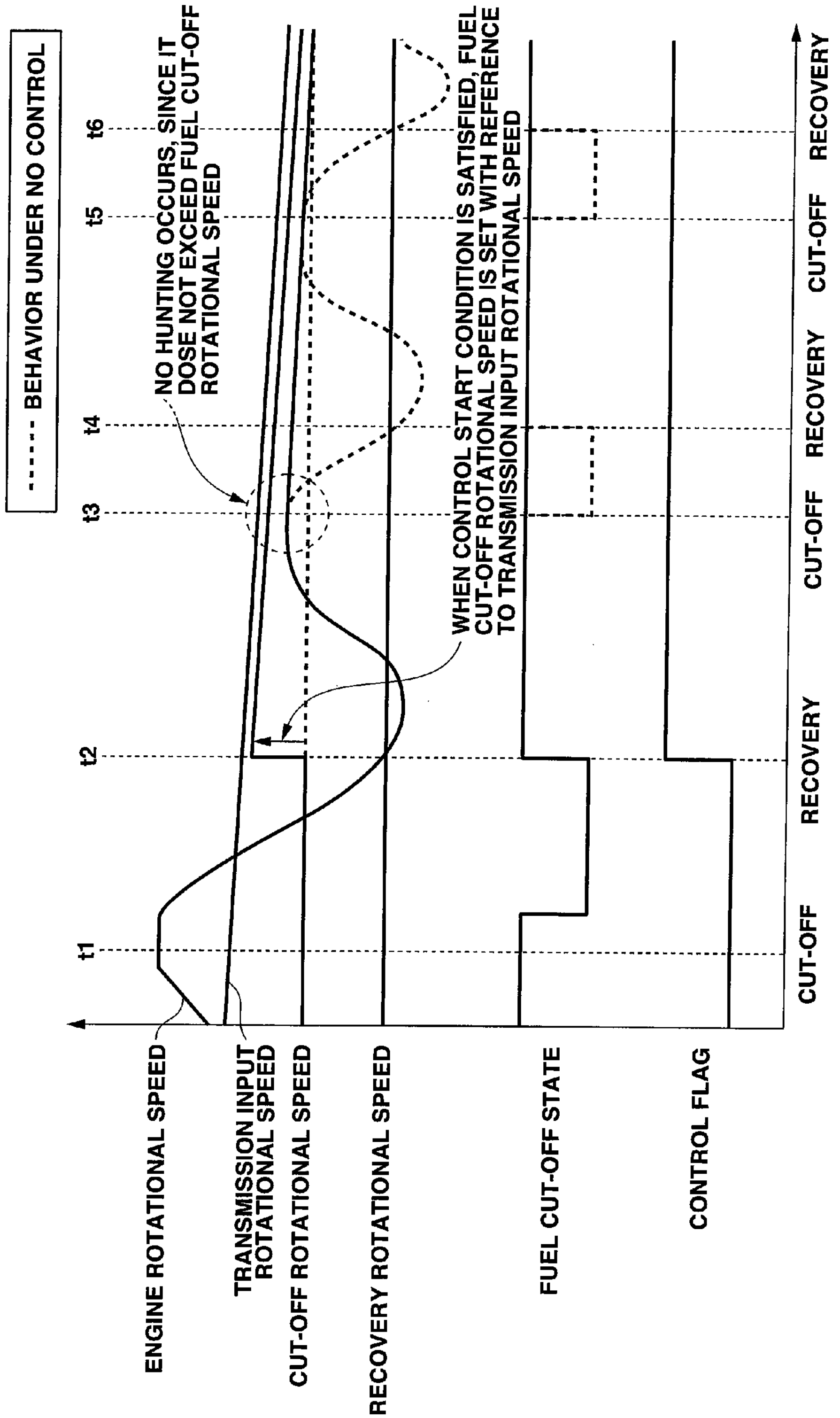
FIG. 3 is a time chart showing a fuel injection control operation at hill coasting according to the first embodiment.

The following describes reasons for which the control described above is performed. FIG. 3 is a time chart showing a fuel injection control operation at hill coasting. In FIG. 3, dotted lines represent the fuel cut-off rotational speed and engine rotational speed during normal control where the control according to the first embodiment is not performed.

At a time instant t1 when the specific condition is satisfied during fuel injection, fuel cut-off is performed so that the engine rotational speed gradually falls. At a time instant t2 when the engine rotational speed falls below the preset fuel cut-off recovery rotational speed, fuel cut-off is terminated so that fuel injection is restarted, and thereby the engine rotational speed gradually rises.

If the fuel cut-off rotational speed setting operation descried above is not performed in the first embodiment, there may be a problem of hunting between fuel cut-off and recovery when all of the following conditions (1) to (5) are satisfied after fuel cut-off:

(1) (recovery rotational speed)≤(engine rotational speed)≤(specific fuel cut-off rotational speed), (2) during coasting, (3) during downhill running, (4) in non-lockup state, and (5) not in a state of fuel cut-off.

During downhill running, torque is inputted from driving wheel TD so that the engine load is low. If fuel cut-off is terminated and fuel injection is restarted, the fuel cut-off rotational speed is exceeded so that fuel cut-off is performed again (from time instant t3 to time instant t4, and from time instant t5 to time instant t6). During running on a long downhill or the like, this condition may continue for a long period in which hunting may occur many times between fuel cut-off and recovery. Even if the fuel cut-off rotational speed is raised at each fuel cut-off as in patent document 1, hunting cannot be avoided until the fuel cut-off rotational speed is raised through a plurality of cycles of fuel cut-off and recovery, because the fuel cut-off rotational speed is not raised at one stroke.

Accordingly, the fuel cut-off rotational speed is set to the hunting-preventing fuel cut-off rotational speed that is higher than the normal fuel cut-off rotational speed, specifically, set to the transmission input shaft rotational speed. During coasting, torque is transmitted from the driving wheel side to the engine so that the transmission input shaft rotational speed is above the engine rotational speed. This prevents the engine rotational speed from exceeding the fuel cut-off rotational speed, thereby prevents further performance of fuel cut-off, and thereby serves to avoid hunting.

In the first embodiment, it is determined on a basis of the outputs of the existing sensors whether or not it is in an operating state where the hunting trouble is highly possible, because it is difficult to determine all of the conditions (1) to (5) without additional special sensors.

Specifically, since no sensor is provided for correctly determining the condition (3), it is not determined whether or not the condition (3) is satisfied. This can cause the present control to be performed even when not on a downhill, namely, even when it is unnecessary to perform the present control (henceforth referred to as useless performance). This may increase the fuel cut-off rotational speed even in a region where is no concern about hunting, adversely affecting the fuel economy.

Accordingly, in order to minimize this useless performance, a further condition “(6) the transmission speed ratio is above a specific value” is added (see Step S6) so that the present control is performed when the transmission speed ratio is on the low side (specifically, in the first speed range or second speed range of the manual mode), in consideration that the possibility of occurrence of the hunting trouble described above is high when the transmission speed ratio is on the low side. This is because when the transmission speed ratio is on the low side, the transmission input shaft rotational speed rises significantly according to the rotational speed inputted from driving wheel TD, and thereby the engine rotational speed highly tends to rise, so that it is conceivable that the possibility that the engine rotational speed exceeds the fuel cut-off rotational speed is high.

When all of the answers to Steps S1 to S7 are YES, the hunting-preventing fuel cut-off rotational speed is set to the transmission input shaft rotational speed at Step S8. However, the hunting-preventing fuel cut-off rotational speed may be set to a rotational speed that is obtained by subtracting an amount of slippage of the torque converter from the transmission input shaft rotational speed, in consideration of slippage of the torque converter, namely in consideration of [engine rotational speed=transmission input shaft rotational speed−amount of slippage of torque converter]. This serves to further prevent useless performance, and thereby suppress an adverse effect on the fuel economy due to inhibition of fuel cut-off.

Hunting can be avoided by performing the control according to the first embodiment, because even if the engine rotational speed falls below the fuel cut-off recovery rotational speed at time instant t2 so that fuel cut-off is terminated and fuel injection is restarted, the engine rotational speed cannot exceed the fuel cut-off rotational speed.

It is possible that after the hunting-preventing fuel cut-off rotational speed is set, the engine rotational speed exceeds the hunting-preventing fuel cut-off rotational speed, for example, due to throttle failures. In such situations, it is possible that torque converter T/C functions for torque amplification so as to output an unintentional driving torque. Accordingly, in such situations, fuel cut-off is immediately performed, and the fuel cut-off rotational speed is returned to the preset specific fuel cut-off rotational speed. This prevents the engine rotational speed from exceeding the transmission input shaft rotational speed so that no driving torque is outputted, and thereby prevents a driver from feeling uncomfortable.

As described above, the first embodiment produces advantageous effects listed below.

(1) It determines whether or not an operating state allows stop and restart of fuel injection to be repeated; and sets a hunting-preventing fuel cut-off rotational speed based on a transmission input shaft rotational speed, when determining that the operating state allows the stop and restart of fuel injection to be repeated, wherein the hunting-preventing fuel cut-off rotational speed replaces a specific fuel cut-off rotational speed. This serves to implement determination about fuel cut-off indirectly based on a gradient of a downhill, and thereby prevent hunting between fuel cut-off and recovery even if the downhill has a steep gradient.

(2) It sets the hunting-preventing fuel cut-off rotational speed, after engine rotational speed falls below a recovery rotational speed after the stop of fuel injection. This allows the fuel cut-off rotational speed to be switched only in a specific region, and thereby minimize an adverse effect on the fuel economy which may be caused by inhibition of fuel cut-off.

(3) When the engine rotational speed exceeds the hunting-preventing fuel cut-off rotational speed, it stops the fuel injection, and replaces the hunting-preventing fuel cut-off rotational speed with the specific fuel cut-off rotational speed. This serves to perform fuel cut-off without making a driver uncomfortable, even when throttle opening or the like becomes abnormal.

(4) It determines whether or not belt-type continuously variable transmission 4 is at a transmission speed ratio above a specific transmission speed ratio; and changes the specific fuel cut-off rotational speed, when determining that belt-type continuously variable transmission 4 is at a transmission speed ratio above the specific transmission speed ratio. This serves to prevent the operation of raising the fuel cut-off rotational speed from being performed unnecessarily, and thereby avoid an adverse effect on the fuel economy.

Figure 4:
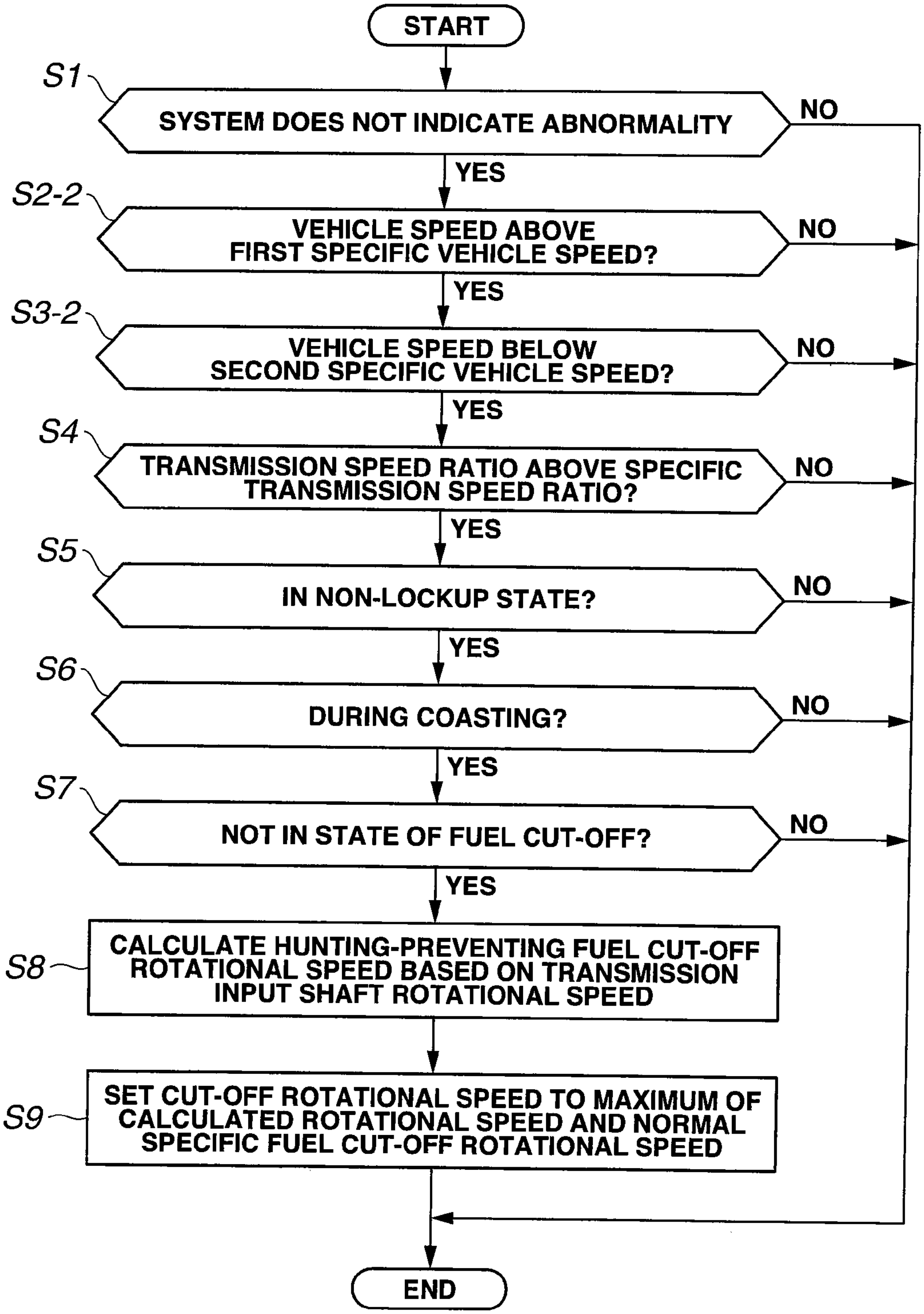
FIG. 4 is a flow chart showing a fuel cut-off rotational speed setting operation in a fuel cut-off control performed by an engine controller according to a second embodiment.

Next, the following describes a second embodiment. The second embodiment has the same basic construction as the first embodiment. Accordingly, the following describes only differences. FIG. 4 is a flow chart showing a fuel cut-off rotational speed setting operation in a fuel cut-off control performed by an engine controller 2 according to the second embodiment. Steps S1 and S4 to S9 are the same as in the first embodiment. Accordingly, the following describes only different steps.

At Step S2-2, engine controller 2 determines whether or not the vehicle speed is above a first specific vehicle speed. When determining that the vehicle speed is above the first specific vehicle speed, engine controller 2 proceeds to Step S3-2. Otherwise, engine controller 2 exists from this control flow. The first specific vehicle speed is a value that is calculated on a basis of the recovery rotational speed described in the first embodiment and the transmission speed ratio of the first speed stage of the manual mode. Specifically, the first specific vehicle speed is set to a vehicle speed that is defined by a condition that the engine side is at the recovery rotational speed in the first speed stage, under assumption that the region of hunting is defined by this condition, because the transmission speed ratio of the low side is assumed to be comparable with the transmission speed ratio of the first or second speed stage.

At Step S3-2, engine controller 2 determines whether or not the vehicle speed is below a second specific vehicle speed. When determining that the vehicle speed is below the second specific vehicle speed, engine controller 2 proceeds to Step S4. Otherwise, engine controller 2 exists from this control flow. The second specific vehicle speed is a value that is calculated on a basis of the specific fuel cut-off rotational speed described in the first embodiment and the transmission speed ratio of the second speed stage of the manual mode. Specifically, the second specific vehicle speed is set to a vehicle speed that is defined by a condition that the engine side is at the fuel cut-off rotational speed in the second speed stage, under assumption that the region of hunting is defined by this condition, because the transmission speed ratio of the low side is assumed to be comparable with the transmission speed ratio of the first or second speed stage.

The determination whether or not it is in the region of hunting on the basis of vehicle speed, serves to produce advantageous effects similar to the first embodiment.

Next, the following describes a third embodiment. The third embodiment has the same basic construction as the first embodiment. Accordingly, the following describes only differences. The third embodiment differs from the first embodiment in that the determination at Steps S2-1 and S3-1 whether or not it is in the region of hunting is implemented with a navigation system or the like.

During hill coasting, the engine rotational speed tends to be increased by torque transmitted from driving wheel TD, so that hunting tends to occur. Accordingly, engine controller 2 obtains road gradient information by the navigation system. When determining that the gradient is below a specific gradient, engine controller 2 exits from this control flow. When determining that the gradient is above the specific gradient, engine controller 2 determines that it is in a region of hunting. This serves to produce advantageous effects similar to the first embodiment.

The invention claimed is:

1. An engine control device in a vehicle in which an output of an engine is transmitted to a driving wheel through a transmission, the engine control device comprising:

a sensor for sensing an operating state of the vehicle; and a controller connected to the sensor, wherein the controller is configured to:

stop fuel injection of the engine, when engine rotational speed is above a preset specific fuel cut-off rotational speed while the vehicle is coasting;

restart the fuel injection, when the engine rotational speed falls below a recovery rotational speed while the fuel injection is stopped, wherein the recovery rotational speed is below the specific fuel cut-off rotational speed;

determine whether or not the operating state allows the stop and restart of fuel injection to be repeated; and setting a hunting-preventing fuel cut-off rotational speed based on an input shaft rotational speed of the transmission, when determining that the operating state allows the stop and restart of fuel injection to be repeated, wherein the hunting-preventing fuel cut-off rotational speed replaces the specific fuel cut-off rotational speed.

2. The engine control device as claimed in claim 1, wherein the controller sets the hunting-preventing fuel cut-off rotational speed, after the engine rotational speed falls below the recovery rotational speed after the stop of fuel injection.

3. The engine control device as claimed in claim 2, wherein when the engine rotational speed exceeds the hunting-preventing fuel cut-off rotational speed, the controller stops the fuel injection, and replaces the hunting-preventing fuel cut-off rotational speed with the specific fuel cut-off rotational speed.

4. The engine control device as claimed in claim 3, wherein the controller determines whether or not the transmission is at a transmission speed ratio above a specific transmission speed ratio, for determining whether or not the operating state allows the stop and restart of fuel injection to be repeated.

5. The engine control device as claimed in claim 2, wherein the controller determines whether or not the transmission is at a transmission speed ratio above a specific transmission speed ratio, for determining whether or not the operating state allows the stop and restart of fuel injection to be repeated.

6. The engine control device as claimed in claim 1, wherein when the engine rotational speed exceeds the hunting-preventing fuel cut-off rotational speed, the controller stops the fuel injection, and replaces the hunting-preventing fuel cut-off rotational speed with the specific fuel cut-off rotational speed.

7. The engine control device as claimed in claim 6, wherein the controller determines whether or not the transmission is at a transmission speed ratio above a specific transmission speed ratio, for determining whether or not the operating state allows the stop and restart of fuel injection to be repeated.

8. The engine control device as claimed in claim 1, wherein the controller determines whether or not the transmission is at a transmission speed ratio above a specific transmission speed ratio, for determining whether or not the operating state allows the stop and restart of fuel injection to be repeated.

* * * * *